(12) United States Patent
Cermak

(10) Patent No.: US 6,854,635 B2
(45) Date of Patent: Feb. 15, 2005

(54) METHOD OF ATTACHING A BALANCING MASS

(75) Inventor: Herbert Cermak, Bessenbach (DE)

(73) Assignee: GKN Driveline Deutschland GmbH (DE)

(*) Notice: Subject to any disclaimer, the term of this patent is extended or adjusted under 35 U.S.C. 154(b) by 0 days.

(21) Appl. No.: 10/641,944

(22) Filed: Aug. 14, 2003

(65) Prior Publication Data
US 2004/0092321 A1 May 13, 2004

(30) Foreign Application Priority Data
Aug. 14, 2002 (DE) .......................... 102 37 216

(51) Int. Cl.$^7$ .......................... B23K 31/02; B23K 20/08
(52) U.S. Cl. .......................... 228/115; 228/107
(58) Field of Search .......................... 228/107, 115, 228/112.1, 113

(56) References Cited

U.S. PATENT DOCUMENTS

| | | | |
|---|---|---|---|
| 3,968,769 A | 7/1976 | Gusarov et al. | |
| 3,996,883 A | 12/1976 | Gusarov et al. | |
| 5,278,391 A | * 1/1994 | Yakami | 219/137 R |
| 5,981,921 A | 11/1999 | Yablochnikov | |
| 6,718,924 B1 | * 4/2004 | Isaacs et al. | 123/90.6 |
| 2003/0057262 A1 | * 3/2003 | Klampfl | 228/112.1 |
| 2004/0092321 A1 | * 5/2004 | Cermak | 464/180 |
| 2004/0136776 A1 | * 7/2004 | Kehrer | 403/270 |

FOREIGN PATENT DOCUMENTS

| | | |
|---|---|---|
| DE | 1 953 127 | 4/1971 |
| DE | 74 17 316 | 9/1974 |
| DE | 30 11 824 A1 | 10/1981 |
| DE | 39 31 055 A1 | 3/1991 |
| JP | 404185936 A * | 7/1992 |

OTHER PUBLICATIONS

Derwent–Acc–No: 1999–346379 Chern.*
Ruge, J.; Handbuch der Schweisstechnik; 1974; pp. 329 to 332.

* cited by examiner

Primary Examiner—Kiley S. Stoner

(57) ABSTRACT

A method of attaching a balancing mass to a rotational member which has to be balanced and comprises a longitudinal axis X. The method uses magnetic pulse welding, wherein the balancing mass, at a high speed, is radially moved towards the longitudinal axis of the rotational member and, when hitting the rotational member, becomes welded thereto.

14 Claims, 1 Drawing Sheet

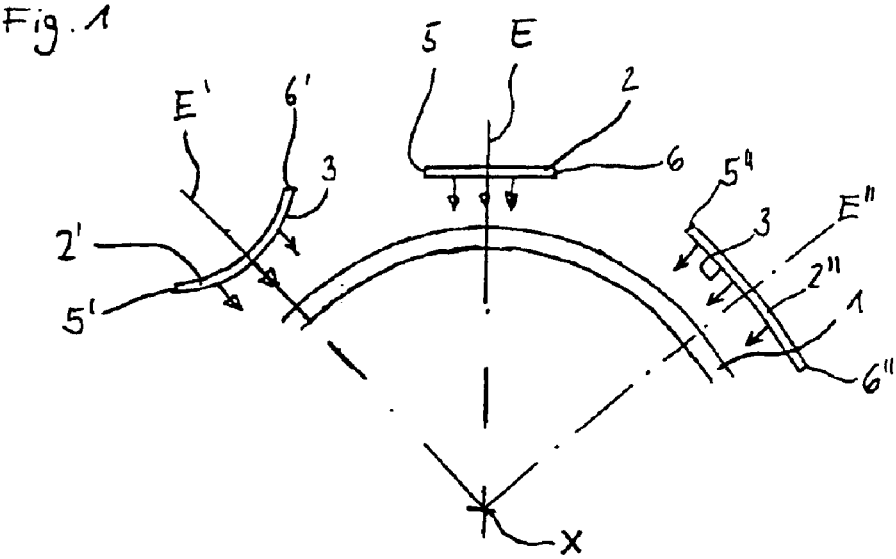
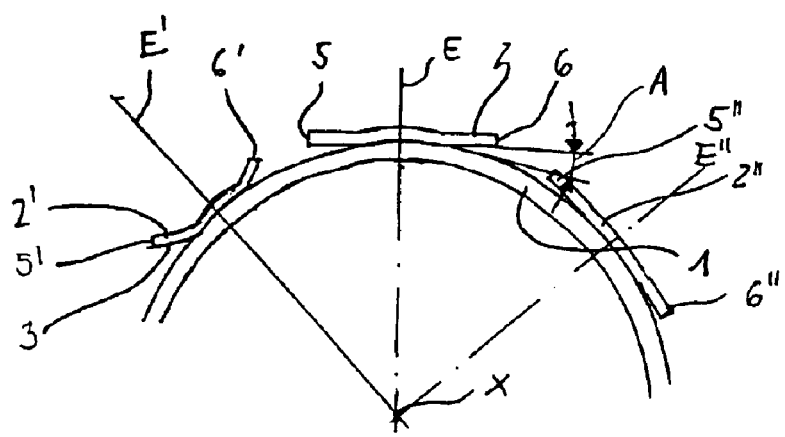
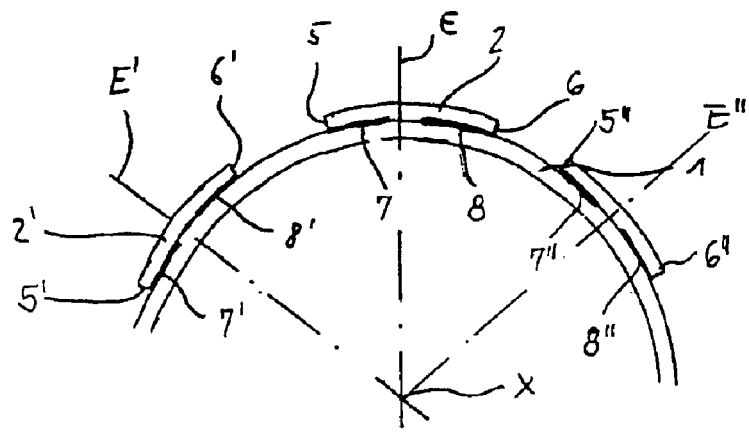

METHOD OF ATTACHING A BALANCING MASS

TECHNICAL FIELD

The invention relates to a method of attaching a balancing mass to a rotational member which has to be balanced and comprises a longitudinal axis. Because of production inaccuracies, shafts, as a rule, suffer from asymmetries in respect of the distribution of masses. These asymmetries cause out-of-balance circumferentially relative to the axis of rotation and in the longitudinal direction relative to the axis of rotation. These out-of-balance properties lead to vibrations when the shaft rotates. To eliminate the out-of-balance, balancing masses are attached to the shaft. Such an operation is referred to as balancing/counterbalancing.

BACKGROUND OF THE INVENTION

DE 30 11 824 proposes a method for balancing a cardan shaft by means of a balancing mass and a method of welding a balancing mass to the cardan shaft. The balancing mass is provided in the form of a curved plate whose inner radius of curvature approximately corresponds to the outer radius of the cardan shaft. The curved plate comprises a plurality of claw-like projections which point towards the cardan shaft. For welding purposes, the balancing mass is received by an electrode with a semicircular cross-section, with the claw-like projections being used for pressing the balancing mass mechanically against the surface of the cardan shaft. The projections penetrate an oxide layer on the surface of the cardan shaft, whereupon welding takes place in the form of resistance welding. In the welding points, it is possible for material embrittlement to occur in the material of the cardan shaft.

From U.S. Pat. No. 5,981,921, there is known a method of connecting a joint yoke to a hollow shaft for the driveline of a motor vehicle by means of magnetic pulse welding. For this purpose, the joint yoke is slid into the hollow shaft by means of a neck portion, with an annular gap being formed between the two components. An inductor positioned on the radial outside of the hollow shaft generates a strong magnetic field with a radially inwardly directed force. When the inductor is discharged, the forces ensure that the hollow shaft, while being radially upset at a high pulse, positions itself around the neck portion of the joint yoke and is welded thereto in the process.

SUMMARY OF THE INVENTION

The present invention provides an improved method of attaching a balancing mass to a rotational member to be balanced, such as a propeller shaft for the driveline of a motor vehicle. The method of the present invention is easier to apply than previous methods.

A method of attaching a balancing mass to a rotational member which has to be balanced and comprises a longitudinal axis is provided. The method is particularly suited for balancing a propeller shaft for the driveline of a motor vehicle. The balancing mass is attached by means of pulse welding, wherein the balancing mass, at a high momentum (impulse), is radially moved from a position of rest towards the longitudinal axis of the rotational member and, when hitting the rotational member, it becomes welded thereto.

The effect of the method is such that, as a result of the pulse, there is generated a very high radially inwardly directed acceleration force which causes the balancing mass to hit the rotationally symmetric member impact-like at a very high speed, as a result of which the kinetic energy is converted into deformation energy and heat, which, in turn, results in coldwelding in the region of contact between the two components. In the region of contact, only a minimum amount of heat is generated and it is closely limited to the region of contact. By applying this method, the structural changes in the rotational member are very slight, so that the strength of the rotational member is not adversely affected by a notch effect. The magnetic pulse welding method is suitable for welding steel components and aluminium components to one another.

According to one embodiment, the balancing mass first hits the rotational member linearly and, at the point in time of hitting same, forms at least one wedge-shaped gap together with the rotational member and, while the balancing mass is being deformed, the wedge-shaped gap is progressively closed. There is thus obtained a linear weld which moves on the rotational member in the circumferential direction, which displaces oxide films or grease films and which, in consequence, succeeds in avoiding inclusions which weaken the welded connection.

In a further embodiment, the balancing mass is provided in the form of a plate which is planar or curved in one direction and, in its position of rest, the plate is arranged in such a way that its surface lines extend parallel relative to the axis of the rotational member. The respective deformation of a plate with a uniform thickness can be achieved with a small amount of energy, especially if there is required only one bending deformation operation in one direction perpendicularly to parallel surface lines.

According to another embodiment, the balancing mass is provided in the form of a plate which, in its position of rest, is symmetrical relative to a radial plane through the longitudinal axis of the rotation-symmetrical member. By providing a plate which is arranged symmetrically and moves symmetrically towards the rotational member it is ensured that the impact is symmetric and that the balancing mass is connected securely on both sides of the plane of symmetry. The balancing mass can first hit the rotational member linearly in the region of a radial plane through the longitudinal axis.

According to a first variant, the starting material for the balancing mass is a planar plate which, in its position of rest, is arranged in a symmetrical position relative to the longitudinal axis at a distance from the rotational member. This embodiment facilitates the preparatory measures because only a simple cut is needed. According to a further embodiment, the starting material for the balancing mass can be a plate which is already curved and which, in its position of rest, is arranged so that its convex face points towards the rotational member. This embodiment is advantageous in that when the plate hits the rotational member, there occur greater wedge angles on both sides of the plane of symmetry, as a result of which the welded connection between the components becomes more secure.

According to yet a further embodiment, the starting material for the balancing mass can be a curved plate which, in its position of rest, is arranged so that its concave face points towards the rotational member and that its radius of curvature is greater than the outer radius of curvature of the rotational member. This is advantageous if, as a result of the materials selected and/or the pulse applied, particularly small wedge angles between the components lead to an optimum welded connection.

According to a further process, if viewed in a cross-section through the rotational member, the balancing mass, when hitting the rotational member, starting from a radial plane through the longitudinal axis of the rotational member, joins the wall of the rotational member towards both sides of the radial plane. During this process, planar cold welding between the balancing mass and the rotational member takes place in the regions of contact adjoining the radial plane on both sides. Because the balancing mass hits the rotational member symmetrically, the two regions adjoining the plane of symmetry on both sides are synchronously connected to the rotational member.

According to another embodiment, the rotational member is provided in the form of a hollow shaft and, when the balancing mass hits the rotational member, the inside of the latter is radially supported in the region of contact. Radial inward buckling of the hollow shaft is thus prevented.

A magnetic pulse method can be used for accelerating the balancing mass, which presupposes an electrically conducting material for the balancing mass. In the course of the magnetic pulse welding operation, electric energy is stored in electric capacitors and transmitted via a discharging switch to the coil-like inductor which is arranged at a distance on the radial outside of the shaft and the balancing mass. As a result, an extremely strong magnetic field is built up in the inductor within the shortest possible time, which applies a high acceleration force to the balancing mass. The acceleration force is directed to the radial inside in the inductor, i.e. to the longitudinal axis of the shaft. It is also possible to use an explosive pulse method (pyrotechnical method), in which case only the welding ability of the materials of the balancing mass and the rotational member have to be considered. In the explosive welding method, an explosive storing chemical energy is applied to the radial outside of the balancing mass relative to the longitudinal axis of the shaft and made to detonate. On the radial outside of the balancing mass, it is possible to provide damming means, for example in the form of a tube slid on to the balancing mass and shaft. The increase in pressure occurring during detonation results in a high acceleration force being applied to the balancing mass, which force should be directed to the longitudinal axis of the shaft.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 shows a hollow shaft with balancing masses to be attached in three variants in a cross-sectional view before welding takes place.

FIG. 2 shows the hollow shaft with the balancing masses according to FIG. 1 during the welding operation.

FIG. 3 shows the hollow shaft with the balancing masses according to FIG. 1 after the welding operation.

DETAILED DESCRIPTION

FIGS. 1 to 3 will be described jointly below. They show a hollow shaft 1 with a longitudinal axis X for the driveline of a motor vehicle. Because of production inaccuracies, shafts are usually subject to asymmetries in respect of the distribution of masses. The asymmetries cause out-of-balance with reference to the longitudinal axis X, which leads to bending and thus vibrations when the shaft rotates. To eliminate the out-of-balance, balancing masses in the form of plates 2 are attached to the hollow shaft 1 by pulse welding. FIG. 1 shows the assembly in the position of rest prior to the welding operation, FIG. 2 shows same during the welding operation and FIG. 3 shows the assembly after the welding operation. Three variants are shown to constitute the starting materials of the balancing mass: a planar plate 2; a curved plate 2' which is convex relative to the hollow shaft; and, a curved plate 2" which is concave relative to the hollow shaft and which comprises a greater radius of curvature than the hollow shaft.

During pulse welding, when the stored energy is discharged, there is generated a high acceleration force which acts radially towards the longitudinal axis X and accelerates the plate 2, 2', 2" from the position of rest on to the hollow shaft 1. This process is illustrated in FIG. 1 by the radially inwardly pointing arrows. The effect of the magnetic forces is that the plate 2 collides impact-like with the hollow shaft 1, so that the two components are welded together in the region of contact.

According to a first embodiment, the starting condition of the plate 2 is planar, with the plate being held and accelerated symmetrically relative to the longitudinal axis X of the hollow shaft. According to a further embodiment, the plate 2' can also be cylindrically curved and it is moved radially towards the hollow shaft 1, with the convex face 3 in front. According to yet a further embodiment, the plate 2" can be curved cylindrically; it first points with its concave face 4 towards the hollow shaft 1, with its curvature being less pronounced than that of the wall of the hollow shaft 1. In all cases, the plates 2, 2', 2" comprise a plane of symmetry E which forms a radial plane E through the longitudinal axis X of the hollow shaft 1. The symmetrical arrangement and movement of the plates 2, 2', 2" towards the hollow shaft 1 ensures that the plates 2, 2', 2" first hit the hollow shaft 1 linearly in the region of the plane of symmetry E before, while starting from here, it moves to the two opposed side edges 5, 6; 5', 6'; 5", 6" and rests against the wall of the hollow shaft 1. When the plate 2 hits the hollow shaft 1, the surfaces of both sides of the plane of symmetry E form a wedge angle A, approach one another progressively towards the outside and collide at a high speed.

During the collision, the dirt and oxide layers commonly found on the faces to be welded are gathered by collecting rays and removed outwardly towards the side edges 5, 6, so that the faces to be welded are cleaned automatically. As a result of the collision, the plate 2 is cold-welded in a planar way to the hollow shaft in the regions of contact adjoining the plane of symmetry E on both sides. In FIG. 3, the planar welded regions have been given the reference numbers 7 and 8.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A method of attaching a balancing mass to a rotational member comprising a longitudinal axis, the method comprising pulse welding the balancing mass to radially move the balancing mass at a high speed from a position of rest towards the longitudinal axis of the rotational member such that, when the balancing mass hits said rotational member, it is welded thereto.

2. A method according to claim 1, wherein the balancing mass first hits the rotational member linearly and, at the point in time of hitting same, forms at least one wedge-shaped gap together with the rotational member and, while the balancing mass is being deformed, the wedge-shaped gap is progressively closed.

3. A method according to claim 2, wherein the balancing mass comprises a plate which is planar or curved in one direction and, in its position of rest, the plate is arranged in such a way that its surface lines extend parallel relative to the longitudinal axis of the rotational member.

4. A method according to claim 2, wherein the balancing mass comprises a plate which, in its position of rest, is mirror-symmetrical relative to a radial plane through the longitudinal axis of the rotational member.

5. A method according to claim 2, wherein the balancing mass comprises a planar plate which, in its position of rest, is arranged in a symmetrical position relative to the longitudinal axis at a distance from the rotational member.

6. A method according to claim 2, wherein the balancing mass comprises a curved plate which, in its position of rest, is arranged so that its convex face points towards the rotational member.

7. A method according to claim 2, wherein the balancing mass comprises a curved plate which, in its position of rest, is arranged so that its concave face points towards the rotational member, and the radius of curvature of the curved plate is greater than the outer radius of curvature of the rotational member.

8. A method according to claim 1, wherein the balancing mass first hits the rotational member linearly in the region of a radial plane through the longitudinal axis of the rotational member.

9. A method according to claim 1, wherein, if viewed in a cross-section through the rotational member, the balancing mass, when hitting the rotational member, starting from a radial plane through the longitudinal axis of the rotational member, joins the wall of the rotational member towards both sides of the radial plane.

10. A method according to claim 8, wherein, if viewed in a cross-section through the rotational member, the balancing mass, when hitting the rotational member, starting from a radial plane through the longitudinal axis of the rotational member, joins the wall of the rotational member towards both sides of the radial plane.

11. A method according to claim 1, wherein the rotational member comprises a hollow shaft and, when the balancing mass hits said rotational member, the inside of the rotational member is radially supported in the region of contact.

12. A method according to claim 10, wherein the rotational member comprises a hollow shaft and, when the balancing mass hits said rotational member, the inside of the rotational member is radially supported in the region of contact.

13. A method according to claim 1, wherein the step of pulse welding comprises a magnetic pulse welding the balancing mass.

14. A method according to claim 1, wherein the step of pulse welding comprises explosive pulse welding the balancing mass.

* * * * *